US007519947B2

(12) United States Patent
Shukla et al.

(10) Patent No.: US 7,519,947 B2
(45) Date of Patent: Apr. 14, 2009

(54) ORCHESTRATION DESIGNER

(75) Inventors: Dharma Shukla, Sammamish, WA (US); Mayank Mehta, Bellevue, WA (US); Yao Lu, Redmond, WA (US); Aditya Bhandarkar, Redmond, WA (US); Eddie Fusaro, Redmond, WA (US); Mark N. Wain, Seattle, WA (US); David Fong, Kirkland, WA (US); Kumarswamy Valegerepura, Bellevue, WA (US); Akash Sagar, Redmond, WA (US); Muralidhara V. Chiluvuri, Sammamish, WA (US); Ravi S. Vedula, Bellvue, WA (US)

(73) Assignee: Microsoft Corporation, Redmond, WA (US)

( * ) Notice: Subject to any disclaimer, the term of this patent is extended or adjusted under 35 U.S.C. 154(b) by 588 days.

(21) Appl. No.: 10/618,865

(22) Filed: Jul. 14, 2003

(65) Prior Publication Data

US 2005/0015746 A1 Jan. 20, 2005

(51) Int. Cl.
*G06F 9/45* (2006.01)
(52) U.S. Cl. .................................................... 717/113
(58) Field of Classification Search ........................ None
See application file for complete search history.

(56) References Cited

U.S. PATENT DOCUMENTS

| 5,444,836 | A * | 8/1995 | Hollingsworth et al. ...... 345/634 |
| 5,485,615 | A * | 1/1996 | Wennmyr .................... 717/109 |
| 6,898,783 | B1 * | 5/2005 | Gupta et al. ................. 717/105 |
| 6,973,638 | B1 * | 12/2005 | Gangopadhyay et al. .... 717/104 |
| 7,028,222 | B2 * | 4/2006 | Peterson et al. ............. 717/109 |
| 7,120,896 | B2 * | 10/2006 | Budhiraja et al. ........... 717/105 |
| 2002/0066074 | A1 * | 5/2002 | Jabri .......................... 717/105 |
| 2003/0237026 | A1 * | 12/2003 | Petersen et al. .............. 714/38 |
| 2004/0215441 | A1 * | 10/2004 | Orofino et al. ................ 703/22 |
| 2005/0071171 | A1 * | 3/2005 | Dvorak ....................... 704/275 |

OTHER PUBLICATIONS

Hudson, S.E. and Tanaka, K., "Providing Visually Rich Resizable Images for User Interface Components," *Proceedings of the 13th Annual ACM Symposium on User Interface Software and Technology*, Nov. 5-8, 2000, pp. 227-235.

(Continued)

*Primary Examiner*—John Chavis
(74) *Attorney, Agent, or Firm*—Birch, Stewart, Kolasch & Birch, LLP (57) ABSTRACT

The present invention supports the design of a process using a drawing surface that specifies the process with underlying programmatic constructs. In response to a user's command, a construct corresponding to a shape is selected from a palette and inserted onto a design region that shows the specified process. The command is verified to be consistent with semantics of an associated process type. If so, a visual image of the specified process is updated. If not, an indicator is generated in a proximity of a relevant portion of the visual image in order to help the user resolve the inconsistency. The user is able to correct errors before generating computer-executable instructions from a high-level code emission. Computer-executable instructions are also generated from high-level code emission. A process engine is cognizant of the associated high-level lines of code and an infrastructure knowledge base while executing the computer-executable instructions.

18 Claims, 10 Drawing Sheets

OTHER PUBLICATIONS

Ishizaki, S., "Multiagent Model of Dynamic Design: Visualization as an Emergent Behavior of Active Design Agents," *Human Factors in Computing Systems, Common Ground, CHI'96 Conference Proceedings*, Apr. 13-18, 1996, pp. 347-354.

Horton, W., "Top Ten Blunders by Visual Designers," *Computer Graphics*, vol. 29, No. 4, Nov. 1995, pp. 20-24.

Usui, S., "Application Generators Speed Up Development of Acquisition/Analysis/Control Systems," *Proceedings of IEEE Instumentation and Measurement Technology Conference—IMTC'94*, May 10-12, 1994, vol. 3, pp. 1507-1508.

Graf, M., "Building a Visual Designer's Environment," *Proceedings 1987 Fall Joint Computer Conference- Exploring Technology: Today and Tomorrow*, Oct. 25-29, 1987, pp. 287-291.

Pusnik, M., et al., "Evaluation of Technologies for Business Process Automation," *Informatica*, vol. 26, No. 4, Dec. 2002, pp. 373-380.

Schmidt, T., et al., "Agile E-Business Process Assembly and Development," Fifth IEEE/IF IP International Conference on Information Technology for Balanced Automation Systems in Manufacturing and Services (BASYS'02), Sep. 25-27, 2002, pp. 375-382.

Mullet, K. and Sano, D., "Designing Visual Interfaces," ACM SIGCHI Bulletin, 1196, pp. 82-83.

Mullet, K., "Designing Visual Interfaces: How to Create Communication-Oriented Solutions," *Human Factors in Computing Systems, Common Ground, CHI'96 Conference Proceedings*, Apr. 13-18, 1996, pp. 332-333.

* cited by examiner

ORCHESTRATION DESIGNER

FIELD OF THE INVENTION

The present invention relates to a software design tool for specifying and implementing processes such as business processes.

BACKGROUND OF THE INVENTION

A major objective of software design is to develop software for complex systems more cost effectively with better quality. Complex systems often include constituent systems that are supported by different types of computers that may use different programming languages. As an example, a business may have an inventory system, an accounting system and an ordering system that were developed independently of each other. In order to reduce costs and to increase efficiency, the business may wish to combine these systems in an integrated fashion. Integrating the constituent systems may be difficult and costly. Thus, there is a real need for design tools that facilitate the development of software that can spans across the constituent systems.

Currently, there are many design tools that can be used for visual modeling. For example, Rational Rose® is a suite of tools that models systems with component-based architectures. Although Rational Rose may be used to model business processes, it is primarily directed to low-level interactions between object-oriented programming components. The tool suite generates templates and code fragments to assist software developers in creating an application. However, the software developer must understand the low-level code and then modify and augment the code to produce a functioning application. Moreover, tools in this suite do not have a real-time visual validation and error prevention.

IBM MQ Series Workflow Builder and Holosofx Workbench (WebSphere® Business Integration Workbench) are both visual workflow modeling tools that allow the design of processes that are used on IBM's MQ Series computers. A design surface allows a user to define simple document routing processes to back-end data-stores. These tools produce framework templates and exportable data structures that assist a software developer in creating an application. However, the software developer must interact with the underlying code using a low-level programming language to create an application. Also, Visio® is a design tool that can be used for visually modeling business processes. However, its primary purpose is only to produce a visual description of systems and does not produce a computer-executable application. Other design tools generate output that does not include computer-executable instructions but rather generate metadata, as may be represented, for instance in an Extensible Markup Language (XML) file.

There is a real need in the industry for methods and apparatuses that remove the software programmer from writing code (or machine instructions) using an underlying low-level software language in order to generate an output that is computer-executable. Currently, design tools often generate a metadata output that typically requires processing the metadata at run time by translation software in order to create computer-executable instructions, thus delaying the completion of the project and potentially degrading the execution time of an application. Also, with a metadata output the user is typically able to "muck up" the output. Translation software processing may be required at each instance of execution of the application. However, design tools that generate an output at a low-level program language typically require the user to have knowledge of the low-level program language in order to edit the output. Thus, enabling the user to design an application at a high level while generating computer-executable instructions as an output that is scalable (i.e. capable of being executed on different computer platforms at run time) would be very beneficial to advancing the art.

BRIEF SUMMARY OF THE INVENTION

The present invention provides methods and apparatuses for designing a process, e.g. a complex business process, using a user-friendly, intuitive drawing surface that specifies the process with underlying programmatic constructs. The process may span a plurality of systems, in which the systems communicate and interact with each other. Thus, the methods and apparatuses can orchestrate a plurality of systems when designing a process. In response to a user's command, a construct corresponding to a shape may be selected from a palette and inserted onto a design region that shows the specified process. The methods and apparatuses verify that the command is consistent with semantics of an associated process type. If so, a visual image of the specified process is updated.

With another aspect of the invention, if a command is not consistent with the semantics, an indicator is generated in a proximity of a relevant portion of the visual image in order to help the user resolve the inconsistency. Thus, the user is able to correct errors before generating computer-executable instructions from a high-level code emission.

With another aspect of the invention, computer-executable instructions are generated from high-level code emission, where the high-level code emission corresponds to the visual image of the specified process. A process engine is cognizant of the associated high-level lines of code and an infrastructure knowledge base while executing the computer-executable instructions. Consequently, the execution of computer-executable code is transport agnostic and is scalable.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
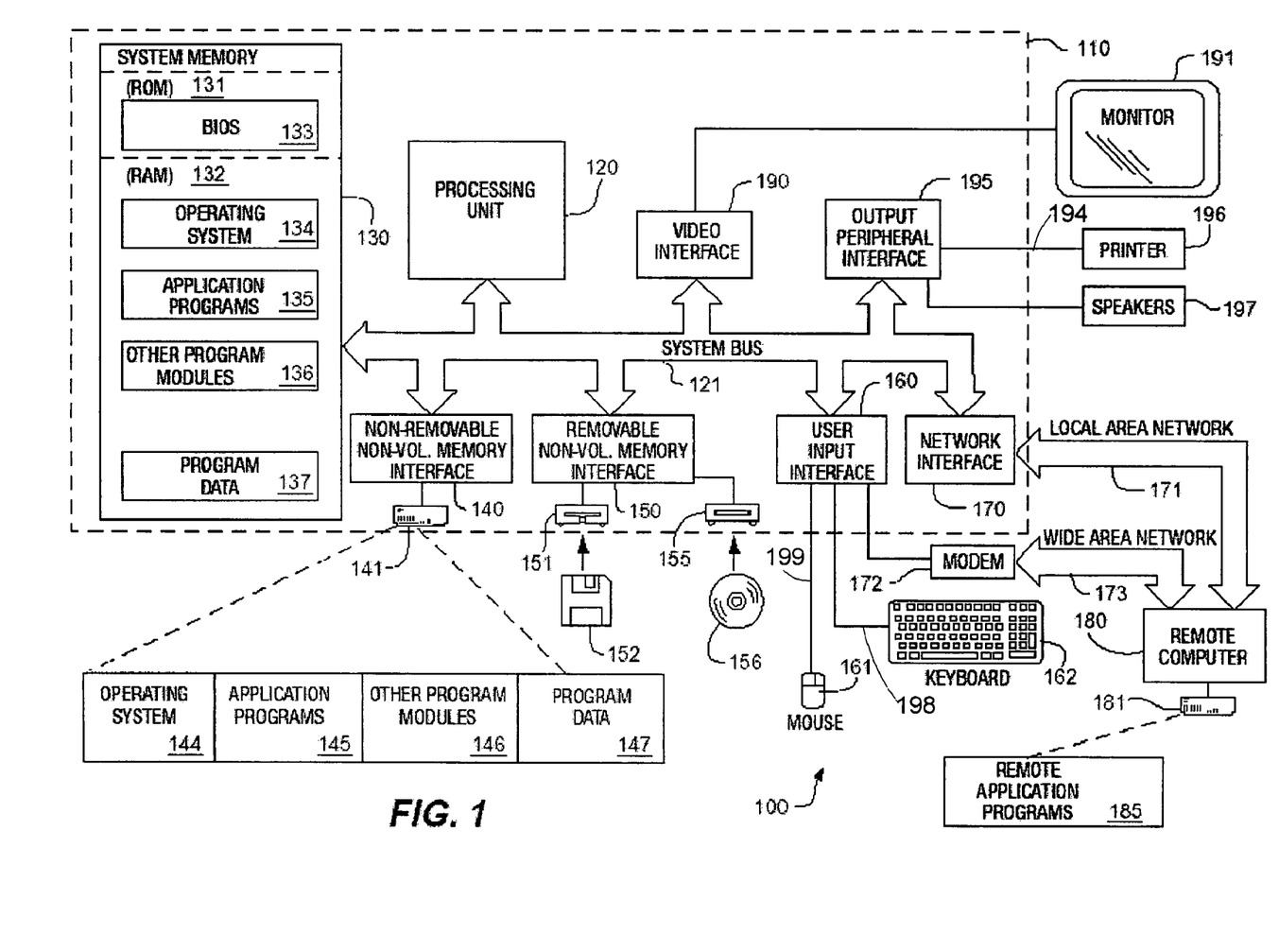
FIG. 1 illustrates an example of a suitable computing system environment on which the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

Computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to system bus 121 through an non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 1, provide storage of computer readable instructions, data structures, program modules and other data for computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

In an embodiment of the invention, pointing device 161 may be implemented as a mouse with an optical sensor for detecting movement of the mouse. Other input devices (not shown) may include a microphone, joystick, game pad, satellite dish, scanner, or the like. These and other input devices are often connected to processing unit 120 through a user input interface 160 that is coupled to the system bus, but may be connected by other interface and bus structures, such as a parallel port, game port or a universal serial bus (USB). A monitor 191 or other type of display device is also connected to system bus 121 via an interface, such as a video interface 190. In addition to the monitor, computers may also include other peripheral output devices such as speakers 197 and printer 196, which may be connected through an output peripheral interface 195.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to the LAN 171 through a network interface or adapter 170. When used in a WAN networking environment, computer 110 typically includes a modem 172 or other means for establishing communications over the WAN 173, such as the Internet. Modem 172, which may be internal or external, may be connected to system bus 121 via user input interface 160, or other appropriate mechanism. In a networked environment, program modules depicted relative to computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 3:
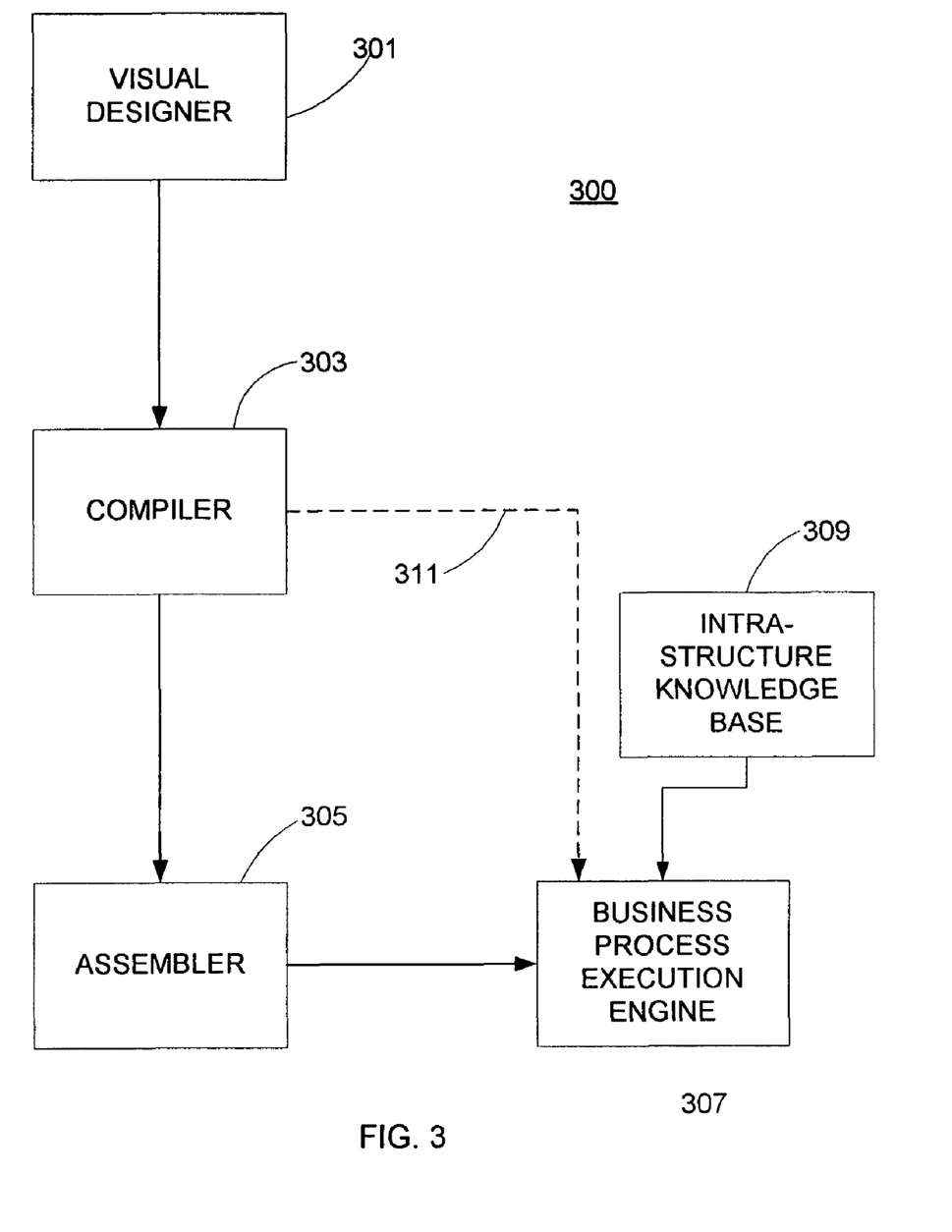
FIG. 3 illustrates an apparatus for designing and executing a process in accordance with an embodiment of the invention.
Figure 4:
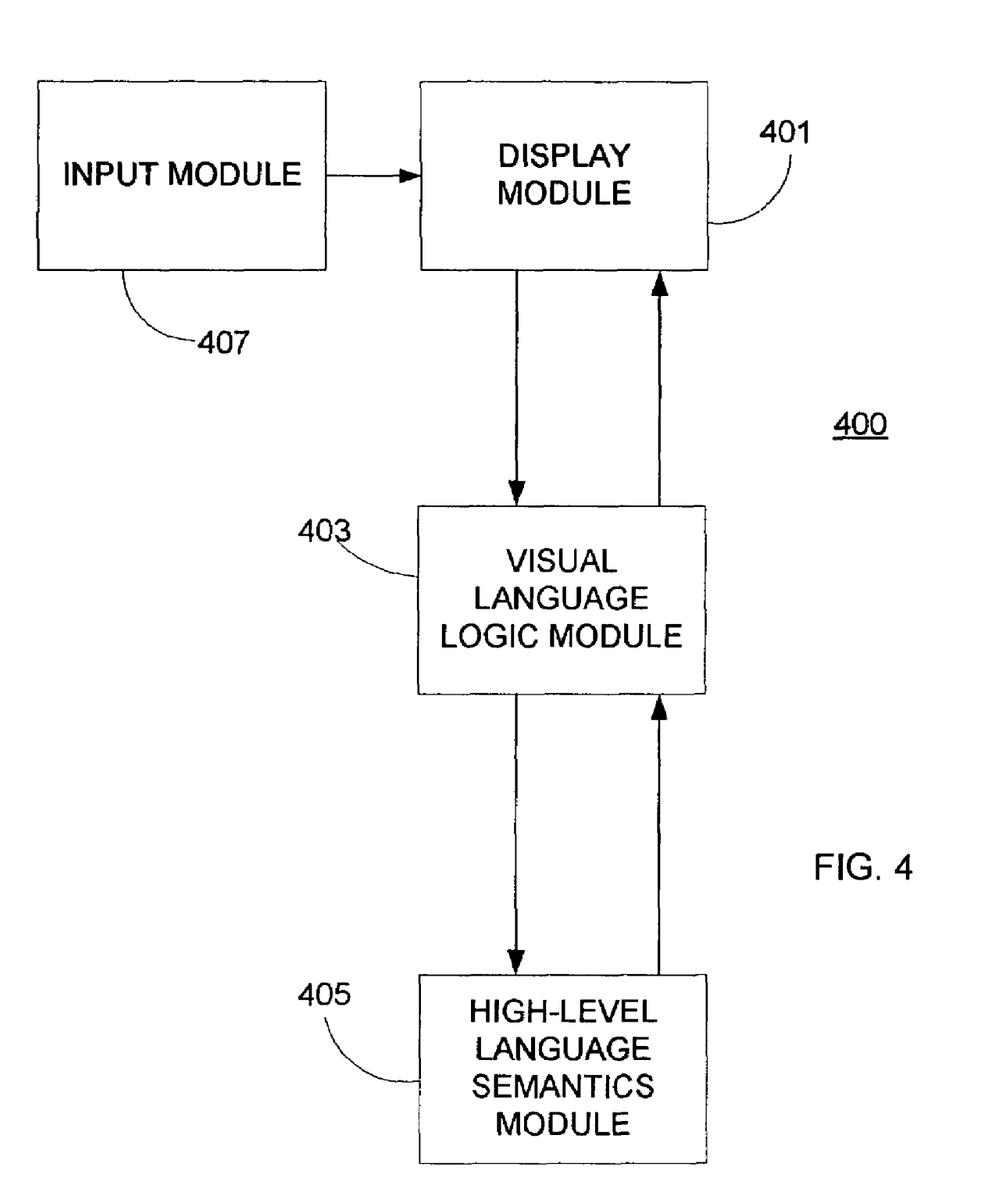
FIG. 4 illustrates an architecture of a visual designer, as shown in FIG. 3, in accordance with an embodiment of the invention.
Figure 5:
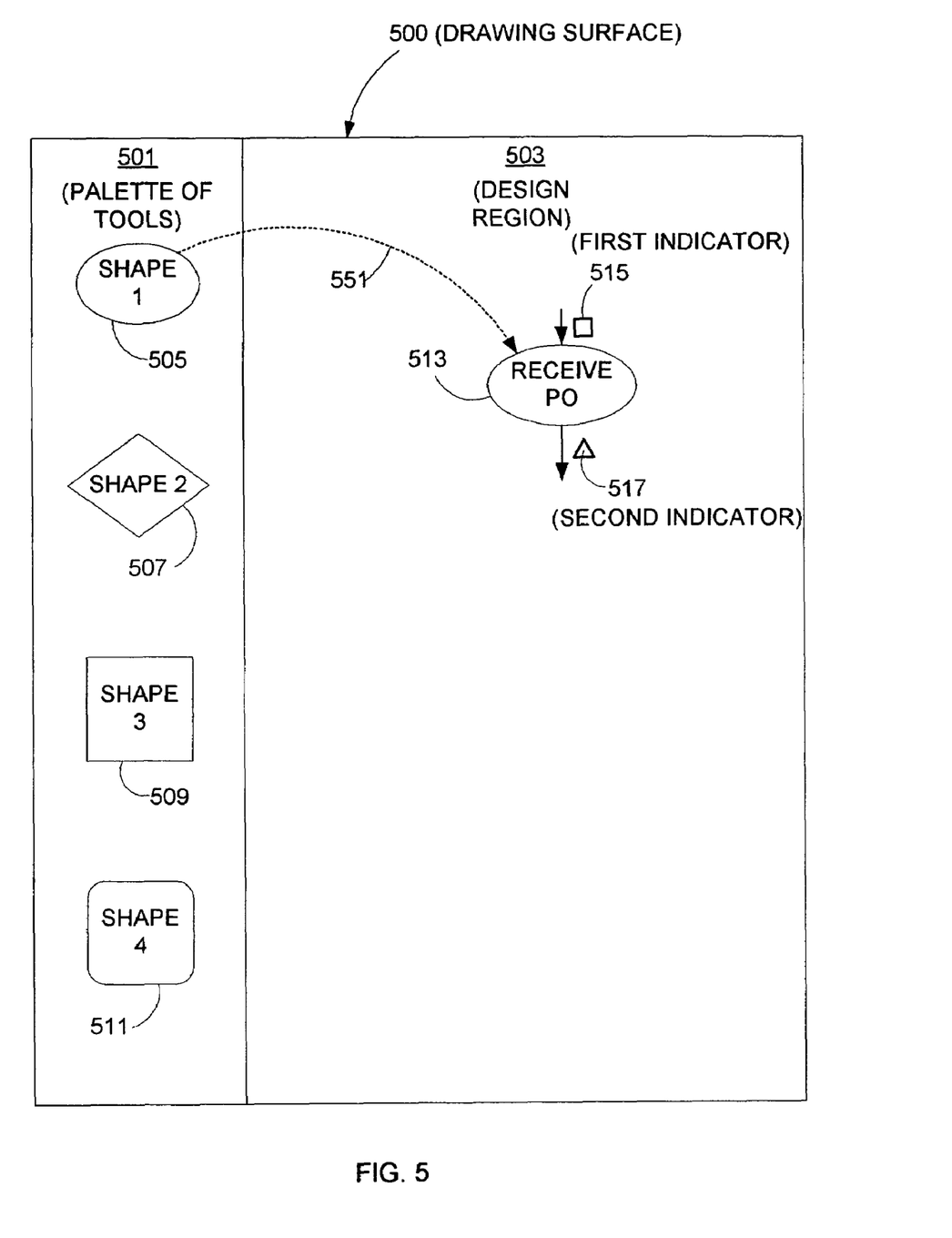
FIG. 5 illustrates a design surface in accordance with an embodiment of the invention.

Computer 110 may support an operating environment for generating a user interface for designing a process building as discussed in the context of FIGS. 2-10. In an embodiment, computer 110 is the platform for a orchestration designer, on which a user may build a process. Processing unit 120 generates and supports a design surface (e.g. drawing surface 500 as shown in FIG. 5) and displays the design surface to a user on monitor 191 through video interface 190. The user can utilize the user interface by operating on the drawing surface with a peripheral device (e.g. mouse 161) in order to build a process. The process may be subsequently executed on computer 110 or may be executed on remote computer 180. While FIG. 1 illustrates one applicable environment in which an embodiment of the invention may operate, other embodiments of the invention may be applicable to other operating environments.

Figure 2:
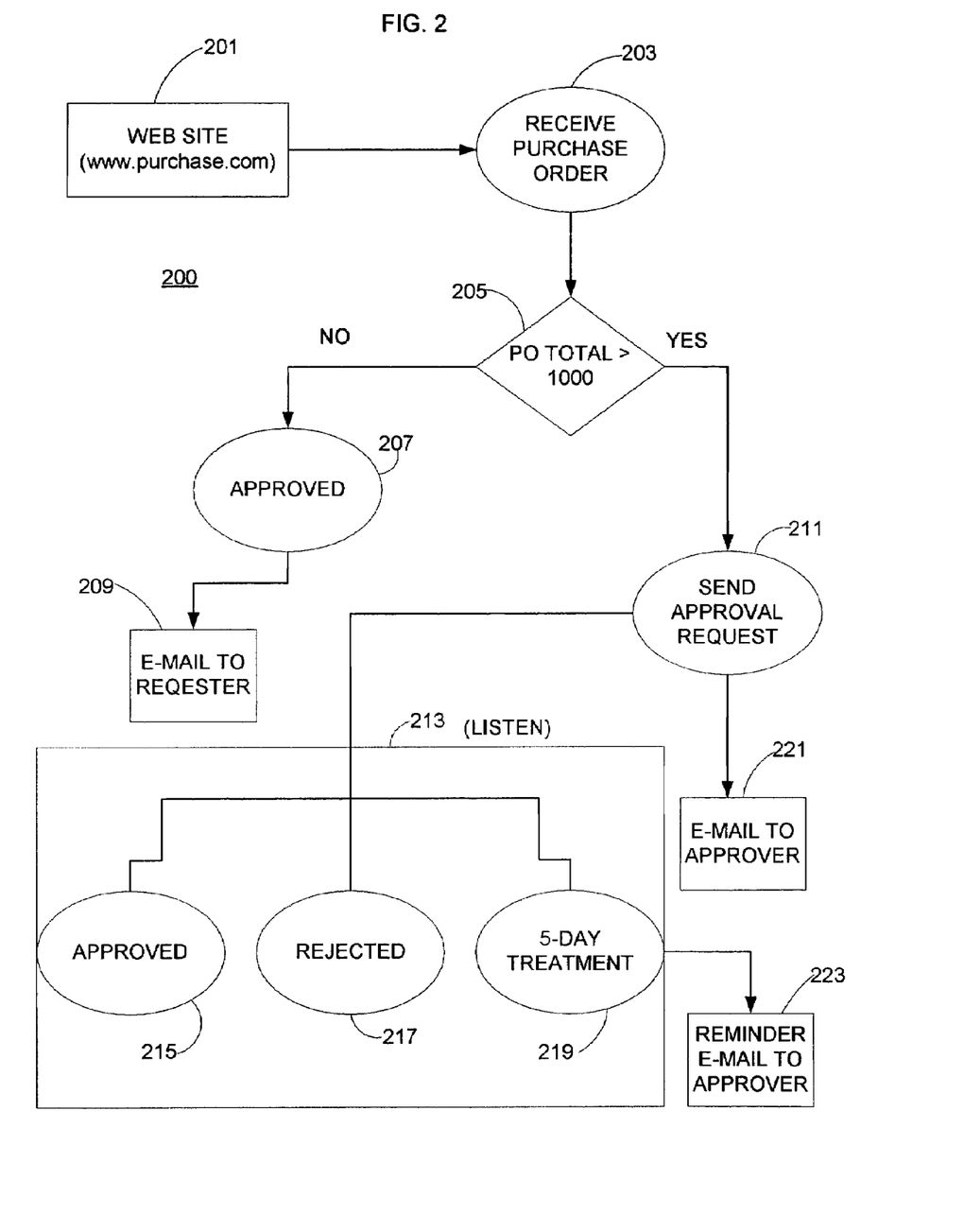
FIG. 2 illustrates an exemplary ordering process that is modeled in accordance with an embodiment of the invention.

FIG. 2 illustrates an exemplary ordering process 200 that is modeled in accordance with an embodiment of the invention. Ordering process 200 comprises of a plurality of constructs that correspond to shapes 201-223. Different shapes correspond to different construct types. For example, a rectangle (e.g. shape 201 and shape 221), corresponds to a port entity. A shape 201 denotes a web site (having a URL of "www.purchase.com") and a shape 221 denotes an email address of an approver. Ordering process 200 enables purchase orders to be received at a web site, for approval requests to be sent, and for responses from the approvers to be received. However, a business typically has a plurality of departments such as an inventory department, an accounting department, a sales department, and so forth, each department typically having its own system having an associated process. An embodiment of the invention supports the expansion of a process to encompass the plurality of systems. Thus, an embodiment of the invention may "orchestrate" an overall process, where a plurality of systems must communicate and interact with each other.

Referring to FIG. 200 in greater detail, the web site receives a purchase order corresponding to a shape 203 (which is a receive document (message) construct). With a shape 205 (which is a decision construct) if the received purchase order is greater than $1000, then the approval request is sent to a designated approver, which may be identified in a field of the purchase order, corresponding to a shape 211 (which is a send event construct). Consequently, e-mail is sent to the port as identified by shape 221. Moreover, a listen shape 213 (which is a listen construct) may denote that a message (document) may be received in response to sending the e-mail to the approver. Listen shape 213 specifies that a message may be received to approve (corresponding to a shape 215) or to reject the approval request (corresponding to a shape 217). Alternatively, listen shape 213 specifies that if no response is received in 5 days (corresponding to a shape 219), an e-mail reminder is sent to the approver (corresponding to a port shape 223). Alternatively, if decision shape 205 determines that the purchase order is less than $1000, then an approved response is automatically sent to the requester (corresponding to shapes 207 and 209).

While FIG. 2 illustrates a business process, other embodiments of the invention may support the design of other types of processes, including scientific, engineering, administrative, educational, and governmental processes.

FIG. 3 illustrates a designer system 300 for designing and executing a process in accordance with an embodiment of the invention. Designer system 300 comprises a visual designer 301, a compiler 303, an assembler 305, a business process execution engine 307, and an infrastructure knowledge base 309. Visual designer 301 receives commands from a user to build a process, e.g. process 200. Visual designer 301, before accepting a command, verifies that the command is consistent with semantics of a process type (as will be discussed in the context of FIGS. 4-10). If the command is accepted (e.g. placing a selected shape into a visual image of the process), the visual image is updated and shown to the user.

When the visual image of the process has been completed, visual designer 301 outputs a high-level code emission. Each selected shape of the process may correspond to at least one line of high-level code that specifies the corresponding actions. For example, shape 203 (shown in FIG. 2 as "receive purchase order") could generate high-level code to receive a message from an http port having a URL of "www.purchase.com" with a message type of "purchase order."

Even though process 200, as shown in FIG. 2, designates an http port with an URL port www.purchase.com and an e-mail address of the approver, the designation of ports (endpoints) may be decoupled from a process so that port designations can be flexibly modified when, for example, business partners change. The capability of decoupling endpoints from a process are disclosed in patent application "Partner Management", filed on Jul. 14, 2003, and is incorporated by reference in its entirety.

Compiler 303 compiles the emission of high-level code to form compiled code. Compiler 303 may support one of a number of high-level computer languages, including a C#

(C-Sharp) compiler. The compiled output is then processed by assembler 305 to generate computer-executable code. Assembler 305 may utilize one of a number of assemblers, including a .NET® assembler. A design system processing computer-executable code is typically faster than a design system processing metadata, e.g. an XML file. The computer-executable code may be signed with a key, thus providing a degree of security. However, an XML file may be altered or corrupted.

Business process execution engine 307 obtains the computer-executable instructions from assembler 305. (In some embodiments, engine 307 may be implemented on another computer, e.g. a BizTalk® server.) Engine 307 retrieves information from infrastructure knowledge base 309 (e.g. a data structure) that provides infrastructure configuration information, including a port configuration, a protocol selection, and a computer platform execution environment. For example, as shown in FIG. 2, process 200 may not be modified if a port changes or if a communications protocol changes. In other words, the embodiment of the invention is transport agnostic. Also, because infrastructure knowledge base 309 contains information about the computer platform execution environment, designer system 300 provides computer-executable instructions that are scalable, in which the computer-executable instructions may be executed on different processor types. Also, engine 307 has access to the high-level code from compiler 303 through a data link 311. Engine 307 is cognizant of high-level code that is associated with executed computer-executable instructions.

FIG. 4 illustrates an architecture 400 of visual designer 301, as shown in FIG. 3, in accordance with an embodiment of the invention. Architecture 400 comprises a display module 401, a visual language logic module 403, a high-level language semantics module 405, and an input module 407. Display module 401 receives commands from a user through input module 407 in order to modify or create a visual image for the process that is being designed. The user may utilize a mouse, e.g. mouse 161 or keyboard 162 as shown in FIG. 1, for inputting commands. Upon receiving a command (e.g. dragging and dropping a shape onto the drawing surface as discussed with FIG. 5) from the user, display module 401 interacts with visual language logic module to verify that the command is consistent with associated high-level language semantics (grammar) of a process type. For example, with the corresponding process type (e.g. purchasing system), it is not permissible to perform a decision on a message before the message is received. However, other process types (e.g. an educational system) may be characterized by different semantics. Thus, visual language logic module 403 queries high-level language semantics module 405, which contains the semantics for the process type.

In addition to insuring that the commands are consistent with the semantics, display module 401 properly positions inserted shapes into the visual image. For example, with an insertion of a decision shape, display module 401 insures that the decision is symmetrically placed onto the design region with respect to the emanating branches. Also, if the user attempts to place a shape onto or overlapping another shape, display module 401 may readjust the placement of the shapes to have a uniform distribution of the shapes over the design region. In essence, display module 400 may place the shapes so that the resulting visual image has an aesthetic quality to the user.

FIG. 5 illustrates a design surface 500 in accordance with an embodiment of the invention. Drawing surface 500, which is displayed as a visual image to the user, comprises a palette of tools 501 (toolbox) and a design region 503. The embodiment supports a plurality of shape types, including a receive action shape, a send action shape, a decision shape (e.g. if-then), and a listen shape that have been discussed in the context of FIG. 2. The user may drag and drop a selected shape (e.g. shapes 505-511) onto design region 503 in order to design a process. With the exemplary embodiment shown in FIG. 5, shape 1 corresponds to a receive action, shape 507 corresponds to a decision, shape 509 corresponds to a port construct, and shape 511 corresponds to a customization shape in which the user can specify new shapes as discussed with FIG. 6. Other embodiments of the invention may support other shapes corresponding to additional constructs.

Referring to FIG. 5, the user selects shape 505 and drags and drops the selected shape to place shape 513 ("receive po") onto design region 503 with a drag and drop command 551. Consequently, drawing surface 500 displays a first indicator 515 and a second indicator 517 in a proximity of shape 513. Indicators 515 and 517 provide annotations to help the user in designing a process that is consistent with the semantics. For example, first indicator 515 notifies the user that a port needs to be associated with the received purchase order. Second indicator 517 notifies the user that subsequent action should be performed on the received purchase order, e.g. processing parameter fields in the purchase order. Exemplary parameter fields include a purchase order amount, a purchaser's identification, and an approver's name.

As the user designs the process, design system 300 determines if an operation (e.g. inserting a shape on design region 503) is consistent with the semantics. If not, design system 300 prevents the user from performing the operation and may display a corresponding error message on the visual image. The prevention of errors at a high level (before compilation of the high-level code emission) may be referred as "correct-by-construction", in which the user can correct the visual image of the process before compilation by compiler 303. However, the user may bypass error detection at a high level and directly compile a high-level code emission. In such a case, compiler 303 can detect errors at the compiler level.

Figure 6:
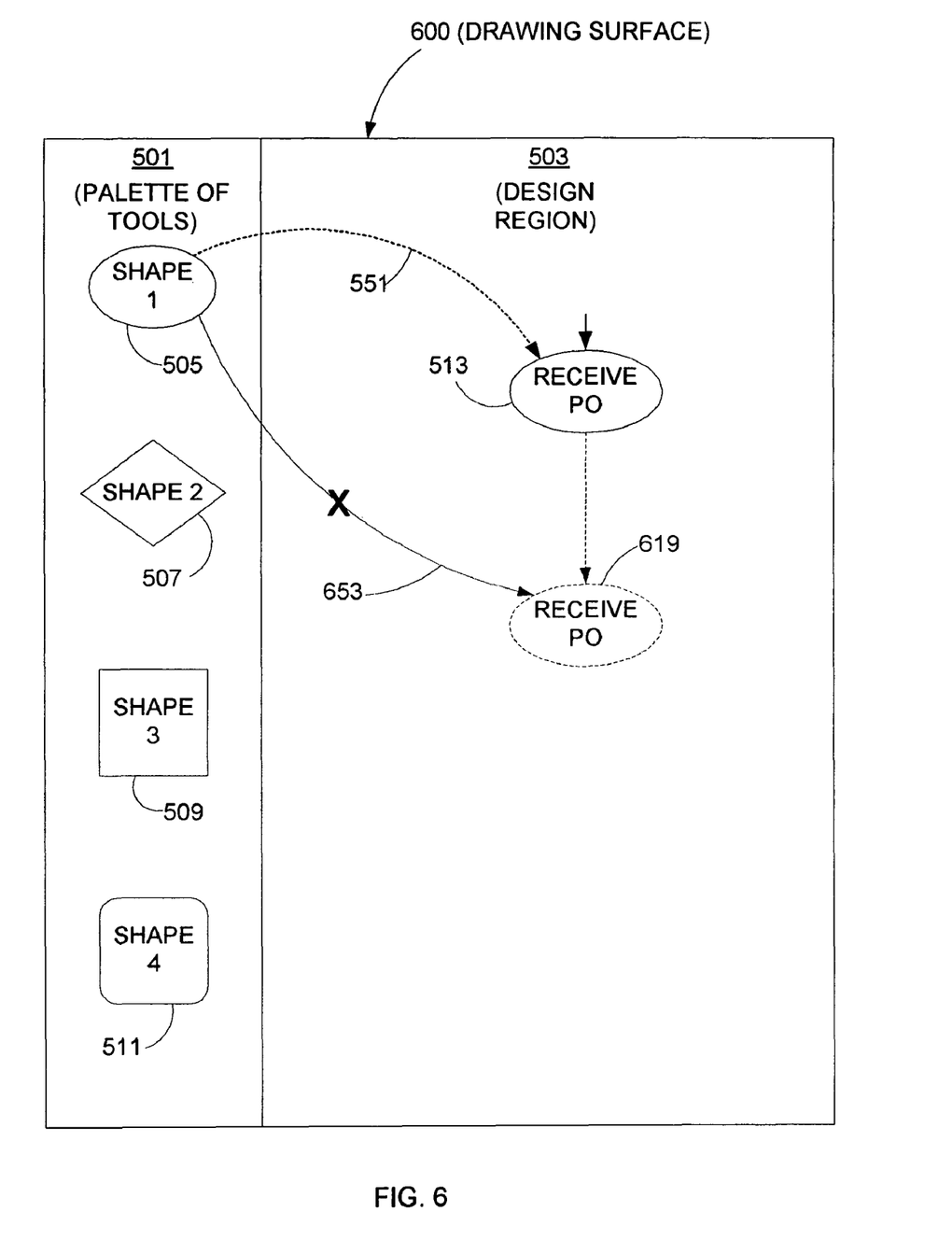
FIG. 6 illustrates a user attempting to insert a shape that is inconsistent with semantics in accordance with an embodiment of the invention.

FIG. 6 illustrates a user attempting to insert a shape 619 that is inconsistent with semantics in accordance with an embodiment of the invention. A user attempts to insert and connect shape 619 to shape 513, both corresponding to receiving purchase order documents. In accordance with the semantics of the exemplary embodiment, an action needs to be performed on the previous received purchase order document before receiving the subsequent purchase order document. Since an operation 653 (dragging and dropping shape 619 and connecting shape 619 to shape 515) is not consistent with the semantics, design system 300 prevents the user from doing so. In other words, command 653 is not accepted by design system 300.

Figure 7:
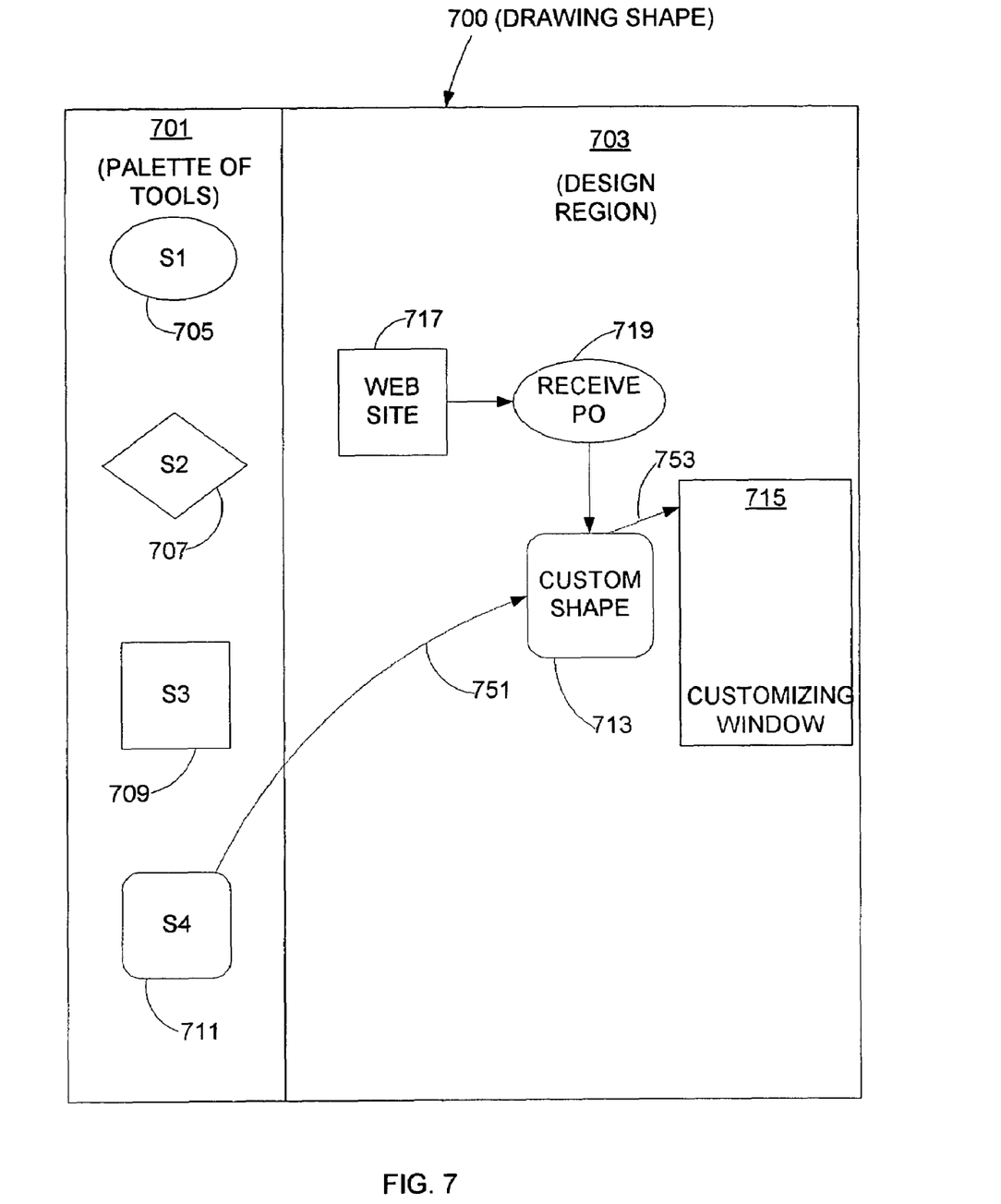
FIG. 7 illustrates utilizing an expression shape in specifying a process in accordance with an embodiment of the invention.

FIG. 7 illustrates utilizing an expression shape 713 in modeling a process in accordance with an embodiment of the invention. In the exemplary embodiment, a user selects a customization shape 711 in palette 701 and drags and drops the selected shape to place shape 713 onto design region 703 with a drag and drop command 751. The user can subsequently customize shape 713 by "double-clicking" (a command 753) on shape 713 to open a customizing window 715. The user can enter high-level code that corresponds to shape 713 and specify the characteristics of the shape, including a type of shape (e.g. by specifying a circle) and location specifications of the shape. With the completion of customizing the shape, the customized shape may be inserted in palette 701 for subsequent use. In the exemplary embodiment, shape 713 may be customized to determine if the received purchase order is valid by comparing the purchaser's identification with a list of acceptable purchasers. High-level code can be inserted in window 715, in which the purchaser's identification is extracted from the received purchase order and compared with a list of acceptable purchasers. If the purchase order is valid, then it is accepted. Otherwise, the purchase order is rejected.

Figure 8:
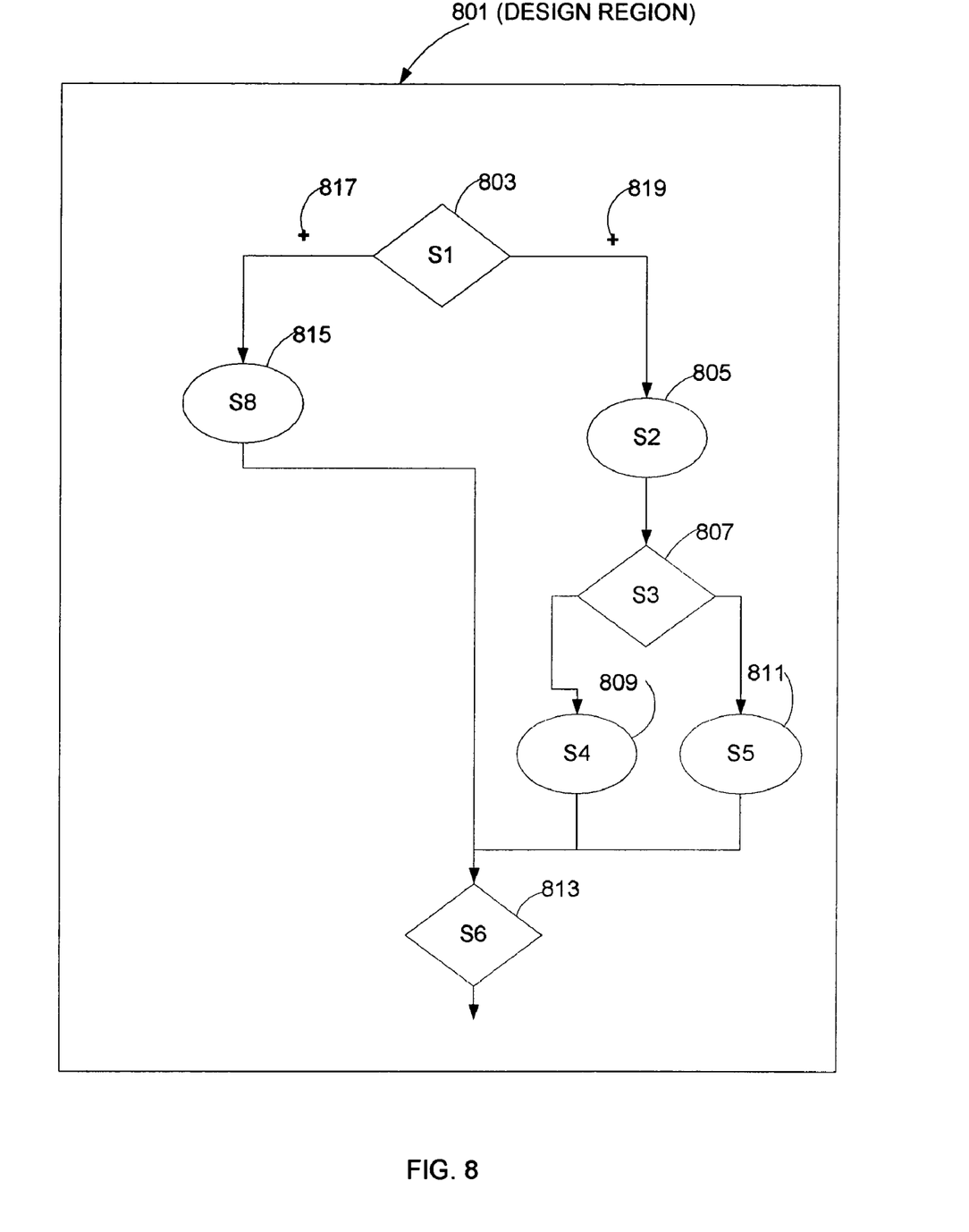
FIG. 8 illustrates a drawing surface in which the constituent branches are expanded according to an embodiment of the invention.

FIG. 8 illustrates a drawing surface 801 in which the constituent branches are expanded according to an embodiment of the invention. Drawing surface 801 specifies a process comprising shapes 803-815. Decision shape 803 has two emanating branches. The first branch comprises shape 815 and the second branch comprises shapes 805-811. Each branch is associated with a detail indicator. The first branch is characterized with a detail indicator 817 and the second branch is characterized with a detail indicator 819. In FIG. 8 both detail indicators 817 and 819 are "+", denoting that the branches are shown in a detailed format.

Figure 9:
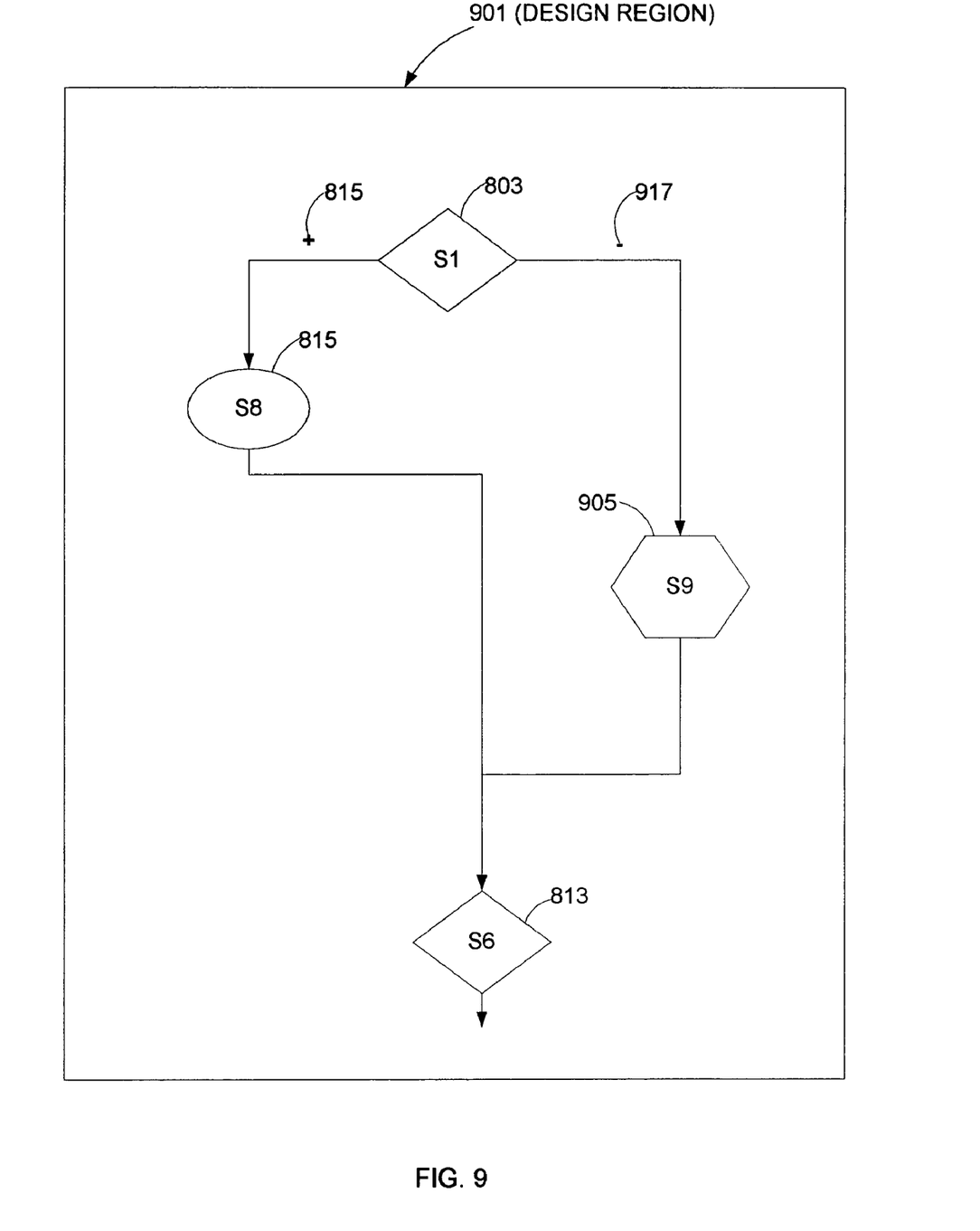
FIG. 9 illustrates a drawing surface, as derived from FIG. 7, in which one of the constituent branches is collapsed according to an embodiment of the invention.

FIG. 9 illustrates a drawing surface 901, as derived from drawing surface 801 shown in FIG. 8, in which one of the constituent branches is collapsed according to an embodiment of the invention. Referring to FIG. 8, the user may "click" with a mouse (e.g. mouse 161 shown in FIG. 1) on a detail indicator to collapse the corresponding branch. For example, the user can click on second detail indicator 817 to collapse the second branch that comprises shapes 805-811. Consequently, the second branch is replaced with another shape 905 that is denotes that the underlying branch has been collapsed. Also, detail indicator 817 is changed to "−" shown as detail indicator 917. The user can subsequently click on detail indicator 917 to expand the underlying branch to show the branch detail as shown in FIG. 8.

With another embodiment of the invention, a visual image of a process with sub-processes can be expanded or collapsed by expanding or collapsing a selected sub-process. The sub-process may be represented with a shape that designates a sub-process. For example, a complex business process may comprise a sub-process for an accounting system, a sub-process for an inventory control system, and a sub-process for an ordering system. A visual image for the business process may be expanded or collapsed by selecting a sub-process. A user, for example, can click on a detail indicator that is associated with the selected sub-process.

Figure 10:
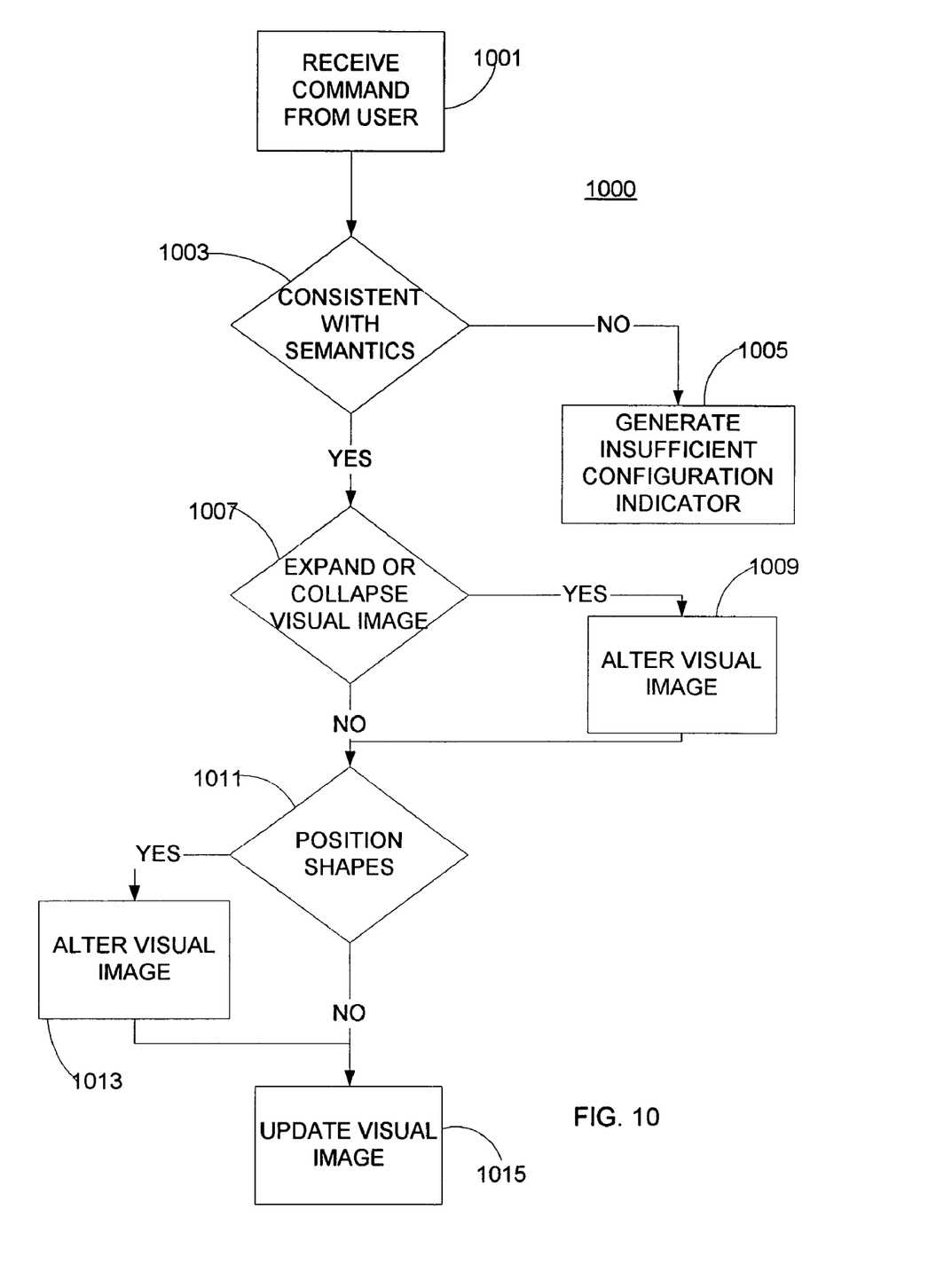
FIG. 10 depicts a logic diagram of a design system in accordance with an embodiment of the invention.

FIG. 10 depicts a logic diagram 1000 of design system 300 in accordance with an embodiment of the invention. Logic diagram 1000 reflects the previous discussions of FIGS. 1-9. In step 1001, design system 300 receives a command (e.g. the user dragging and dropping a shape onto the design region from the palette). In step 1003, design system 300 determines if the command is consistent with the semantics (corresponding to visual language logic module 403 querying high-level language semantics module 405). If not, design system 300, in step 1005, generates an indicator to help the user to resolve the semantics inconsistency. The user may consequently generate a subsequent command.

If step 1003 determines that the command is consistent with semantics, step 1007 determines if the command (e.g. the user clicking on detail indicator 819 as shown in FIG. 8) denotes whether the visual image should be expanded or collapsed. If so, design system 300 will correspondingly alter the visual image in step 1009. In step 1011, design system 300 positions any of the shapes shown in the visual image. If so the visual image is altered in step 1013. The visual image is updated in step 1015 for the user's viewing.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for designing a process, comprising:
   (a) designing a model for a process with a visual display surface, the process being associated with a process type;
   (b) generating a high-level code emission for the process with an association between the model for the process and an user-selected supported, inserted graphical shape-construct corresponding to a visual image; the process being specified by the visual image on the visual display surface; and
   (c) transforming the high-level code emission into computer-executable instructions; through,
      determining a first contextual evaluation whether the supported, inserted graphical shape-construct of step (b) is consistent with semantics corresponding to visual language logic module querying high-level language semantics module which contains semantics for the process type corresponding to previously selected supported, selected graphical shape-construct,
      generating an indicator in a proximity of the inserted graphical shape-construct for updating corresponding visual image of the process type if step (b) is inconsistent with said semantics; and
      transforming the association between the model and the high-level code emission for the process into computer-executable instructions.

2. The method of claim 1, further comprising:
   (d) executing the computer-executable instructions.

3. The method of claim 2, wherein (d) is executed on a plurality of computers.

4. The method of claim 3, wherein the computer-executable instructions are scalable.

5. The method of claim 2, wherein (d) comprises:
   (i) obtaining the high-level code emission;
   (ii) retrieving information about an infrastructure on which the computer-executable instructions are executed; and
   (iii) executing the computer-executable instructions in accordance with the high-level code emission and the information about the infrastructure.

6. The method of claim 5, wherein the computer-executable instructions are transport agnostic.

7. The method of claim 1, wherein the process is a business process.

8. The method of claim 1, wherein (c) comprises:
   (i) compiling the high-level code emission to form compiled code; and
   (ii) assembling the compiled code to form the computer-executable instructions.

9. The method of claim 1, further comprising: allowing the user to bypass any high-level error detection and leaving error detection until the high-level code compiles through a compiler.

10. The method of claim 1, further comprising: user-selected customization for inserted graphical shape-constructs, wherein the user may separately add high-level command functions after selecting the user-selected inserted graphical shape-construct.

11. The method of claim 1, further comprising: user-selected customization for inserted graphical shape-constructs, wherein the user may initially enter high-level command functions, wherein the association between the model and the high-level code emission for the process is automatically triggered and a shape-construct is activated according to the high-level code.

12. An apparatus for designing a process, comprising:
a visual designer that displays a visual image and that generates a high-level code emission, the visual image specifying the process and the high-level code emission specifying the process with an association between the process and the visual image designer that generates the high-level code emission, the process being associated with a process type;
a compiler that obtains the high-level code emission from the visual designer and that transforms the high-level code emission into compiled code; through,
a contextual evaluation determining whether selected input to the visual designer is consistent with semantics corresponding to visual language logic module querying high-level language semantics module which contains the semantics of the process corresponding to previously selected input to the visual designer,
a generator that generates an indicator in a proximity of the selected input for updating corresponding visual image of the process type if the contextual evaluation determines inconsistency with said semantics; and
a transformation is executed with the association between the process and the visual image designer to generate the high-level code emission into compiled code; and
an assembler that assembles the compiled code into computer-executable instructions.

13. The apparatus of claim 12, further comprising:
an infrastructure knowledge base that contains information about an infrastructure of an underlying computer system and an execution environment; and
a process execution engine that queries the infrastructure knowledge base to obtain the information and executes the computer-executable instructions in accordance with the information, the information being indicative about a configuration of the computer system, the process being executed on the computer system.

14. The apparatus of claim 13, wherein the process execution engine is remotely located from the visual designer.

15. The apparatus of claim 13, wherein the process execution engine is co-located with the visual designer.

16. The apparatus of claim 12, wherein the visual designer comprises: an input module that receives a command from a user, the command associated with at least one visual language logic module;
an association to the visual language logic module that determines whether the command is consistent with the semantics of the process type; and
a display module that displays a visual image to a user, that queries the visual language logic module about the command and updates the visual image in accordance with the command, the visual image specifying the process.

17. A computer-readable storage medium storing computer-executable modules, comprising:
(a) an input module that receives a command from a user, the command associated with at least one visual language logic module;
(b) a high-level language semantics module that contains semantics of a process type;
(c) an association to the visual language logic module that determines whether the command is consistent with the semantics of the process type corresponding to the visual language logic module querying high-level language semantics module corresponding to previously selected visual language logic;
(d) a generator module that generates an indicator in a proximity of the selected visual language logic if the association to the visual language logic module determines inconsistency with said semantics; and
(e) a display module that displays a visual image to a user, that queries the visual language logic module about the command and updates the visual image in accordance with the command, the visual image specifying a process, the process being associated with the process type.

18. A method for visually designing a business process, comprising:
(a) displaying a visual image to a user, the visual image specifying a business process;
(b) receiving a command from the user to modify the business process;
(c) determining whether the command is consistent with semantics of a process type, corresponding to visual language logic module querying high-level language semantics module which contains semantics for the process type corresponding to previously selected command,
(d) generating an indicator in a proximity of a relevant portion of the visual image, the business process being associated with the process type;
(e) in response to (d), updating the visual image;
(f) in response to (e) representing the process as a high-level code emission; and
(g) transforming the high-level code emission into computer-executable instructions; and
(h) executing the computer-executable instructions in accordance with the high-level code emission and the information about an infrastructure of a system, the business process being executed on the system.

* * * * *

UNITED STATES PATENT AND TRADEMARK OFFICE
CERTIFICATE OF CORRECTION

PATENT NO. : 7,519,947 B2  
APPLICATION NO. : 10/618865  
DATED : April 14, 2009  
INVENTOR(S) : Dharma Shukla et al.

Page 1 of 1

It is certified that error appears in the above-identified patent and that said Letters Patent is hereby corrected as shown below:

In column 11, line 26, in Claim 12, after "process" insert -- type --.

Signed and Sealed this  
Third Day of May, 2011

David J. Kappos  
*Director of the United States Patent and Trademark Office*